United States Patent
Lee et al.

(10) Patent No.: US 10,000,651 B2
(45) Date of Patent: Jun. 19, 2018

(54) METAL NANOPARTICLE COMPOSITE BODY, METAL COLLOIDAL SOLUTION, AND METHODS FOR PRODUCING THESE

(71) Applicant: DIC Corporation, Tokyo (JP)

(72) Inventors: Seungtaeg Lee, Sakura (JP); Tsuyoshi Morita, Sakura (JP); Masayuki Moriwaki, Sakura (JP); Akeo Takahashi, Sakura (JP); Tomoyo Kajii, Sakura (JP); Zongwu Yao, Shandong (CN)

(73) Assignee: DIC Corporation, Tokyo (JP)

( * ) Notice: Subject to any disclaimer, the term of this patent is extended or adjusted under 35 U.S.C. 154(b) by 504 days.

(21) Appl. No.: 14/416,439

(22) PCT Filed: Jul. 22, 2013

(86) PCT No.: PCT/JP2013/069811
§ 371 (c)(1),
(2) Date: Jan. 22, 2015

(87) PCT Pub. No.: WO2014/017443
PCT Pub. Date: Jan. 30, 2014

(65) Prior Publication Data
US 2015/0203700 A1  Jul. 23, 2015

(30) Foreign Application Priority Data

Jul. 24, 2012 (JP) ................. 2012-163633
Aug. 29, 2012 (JP) ................. 2012-188621

(51) Int. Cl.
 H01B 1/02    (2006.01)
 C09D 11/52   (2014.01)
 B22F 9/24    (2006.01)
 B22F 1/00    (2006.01)
 B01J 13/00   (2006.01)
 B82Y 30/00   (2011.01)

(52) U.S. Cl.
 CPC .......... *C09D 11/52* (2013.01); *B01J 13/0043* (2013.01); *B22F 1/0003* (2013.01); *B22F 1/0018* (2013.01); *B22F 1/0022* (2013.01); *B22F 1/0062* (2013.01); *B22F 9/24* (2013.01); *B82Y 30/00* (2013.01); *H01B 1/02* (2013.01)

(58) Field of Classification Search
 CPC ...................................... H01B 1/02
 See application file for complete search history.

(56) References Cited

U.S. PATENT DOCUMENTS

2006/0065075 A1* 3/2006 Chang ............... B22F 1/0022
                                                    75/371
2010/0120960 A1   5/2010 Lee et al.
2011/0180764 A1* 7/2011 Takahashi ......... B22F 1/0018
                                                    252/514

FOREIGN PATENT DOCUMENTS

| JP | 1999-080647 A | 3/1999 |
| JP | 2002-245854 A | 8/2002 |
| JP | 2004-346429 A | 12/2004 |
| JP | 2005-089784 A | 4/2005 |
| JP | 2006-241372 A | 9/2006 |
| JP | 2006-328472 A | 12/2006 |
| JP | 2008-037884 A | 2/2008 |
| JP | 2010-118168 A | 5/2010 |
| WO | WO-2008/143061 A1 | 11/2008 |

OTHER PUBLICATIONS

Office Action dated Sep. 29, 2015, issued for the Chinese patent application No. 201380026284.5 and English translation thereof.
International Search Report and Written Opinion dated Aug. 27, 2013, issued for PCT/JP2013/069811.

* cited by examiner

*Primary Examiner* — William Young
(74) *Attorney, Agent, or Firm* — Locke Lord LLP

(57) ABSTRACT

Provided are metal nanoparticle composite body whose multiple properties, such as a good metal nanoparticle control property, high dispersion stability, a good low-temperature firing property, and ease of purifying and separating metal nanoparticles, are intentionally added and controlled so that practical electrical conductivity can be exhibited, a metal colloidal solution in which the metal nanoparticle composite body is dispersed, and methods for producing these. A metal nanoparticle composite body includes a nitrogen-containing compound (A) and a metal nanoparticle (B), in which the nitrogen-containing compound (A) contains an oxidized nitrogen atom. A metal colloidal solution is obtained by dispersing the metal nanoparticle composite body in a medium. A method for producing a metal colloidal solution is characterized in that metal ions are reduced in a medium in the presence of a nitrogen-containing compound (A) containing an oxidized nitrogen atom so as to form metal nanoparticles (B).

14 Claims, No Drawings

METAL NANOPARTICLE COMPOSITE BODY, METAL COLLOIDAL SOLUTION, AND METHODS FOR PRODUCING THESE

TECHNICAL FIELD

The present invention relates to a metal nanoparticle composite body suitable as a main component of a conductive ink used in electronic circuit board production, a metal colloidal solution in which the metal nanoparticle composite body is dispersed in a medium, and methods for producing the metal nanoparticle composite body and the metal colloidal solution.

BACKGROUND ART

Printed circuit boards and semiconductor devices are mostly produced by photolithographic processes. However, attentions have been focused on a printable electronic device technology which involves preparing an ink formulation by dispersing a recently developed nanometer-order metal material in some medium, conducting patterning by various printing methods by using the ink formulation, and assembling a device.

This technique is called printed electronics (hereinafter abbreviated as PE). There is a possibility that this technique can be used to mass-produce electronic circuit patterns and semiconductor elements through roll-to-roll processes and thus this technique is expected to bring an on-demand suitability and economy resulting from streamlining of processes and resource saving. Thus, there is an anticipation that the technique may help develop low-cost production methods for display devices, light-emitting devices, IC tags (RFIDs), etc.

PE requires a conductive material ink, a semiconductor material ink, and an insulating material ink as the basic materials. In particular, a conductive ink that contains a metal colloid (metal nanoparticles) of a noble metal (gold, silver, platinum, or the like) and a copper is important. Silver colloids and inks containing silver colloids are leading the development due to their economy and ease of handling.

Silver nanoparticles (or simply referred to as nano silver) constituting a silver colloid has far higher specific surface areas than bulk silver and have a strong tendency to fuse together and decrease surface energy. As a result, the particles fuse to each other at a temperature far lower than the melting point of the bulk silver. This phenomenon is called a quantum size effect (Kubo effect) and the advantage of using silver nanoparticles as the conductive material lies here.

In general, nano materials tend to be expensive since they are produced through special processes, which has obstructed widespread use of the materials. A liquid-phase reduction method that does not require special equipment such as one used in vacuum processes is advantageous for producing silver colloids at low cost. A liquid phase reduction method is a method for obtaining a silver colloid by reducing a silver compound by causing the silver compound to react with a reducing agent in a solvent. In order to limit the size of the silver nanoparticles to be generated to a particular level and realize a stable metal colloid state during this process, a technique of conducting reduction in the presence of a compound called a "colloid protecting agent" has been disclosed. A colloid protecting agent is a polymer compound designed to include a functional group, such as a tertiary amino group, a quaternary ammonium group, a heterocycle having a basic nitrogen atom, a hydroxy group, or a carboxyl group, that can coordinate to a metal particle (for example, refer to PTL 1).

As discussed above, the diameter of silver nanoparticles that are expected to undergo a desirable low-temperature fusion phenomenon is 50 nm or less. As the diameter becomes smaller than this, the amount of the required polymer compound serving as a colloid protecting agent also increases with the specific surface area; thus, the amount of the colloid protecting agent remaining on the silver nanoparticles is increased and low-temperature firing property (the property that the specific resistivity obtained by firing a thin film formed of the silver colloid at 100° C. to 150° C. is on the $10^{-6}$ Ωcm order) becomes difficult to attain, which has been a problem. From the viewpoint of designing a conductive material, a colloid protecting agent needs to exhibit plural properties simultaneously: capacity to make small particles, capacity to protect and stabilize particles, and capacity to rapidly detach from the particle surfaces during sintering so as not to inhibit fusion between particles. It has been difficult to attain these properties simultaneously by only using a technique that uses a commercially available polymer pigment dispersant, such as Solsperse (Zeneca) or Flowlen (Kyoeisha Chemical Co., Ltd.), or a commercially available polymer compound having a pigment affinic group (amine) in the main chain/side chain and two or more solvent affinic portions, etc. (for example, refer to PTL 2 to PTL 4).

To address this problem, there has already been disclosed that a polyalkyleneimine-polyalkylene glycol-hydrophobic segment ternary polymer and a polyalkyleneimine-polyalkylene glycol binary polymer are effective for producing silver nanoparticles (for example, refer to PTL 5 to PTL 7). However, a product that strikes a good balance among control of particle size and distribution, stability of colloidal solutions, and practical electrical conductivity by low-temperature firing has not been obtained from the use of these compounds.

CITATION LIST

Patent Literature

PTL 1: Japanese Unexamined Patent Application Publication No. 2004-346429
PTL 2: Japanese Unexamined Patent Application Publication No. 11-080647
PTL 3: Japanese Unexamined Patent Application Publication No. 2006-328472
PTL 4: 2002-245854
PTL 5: 2008-037884
PTL 6: International Publication No. WO2008/143061
PTL 7: Japanese Unexamined Patent Application Publication No. 2005-89784

SUMMARY OF INVENTION

Technical Problem

An object of the present invention in view of the above-described problems is to provide a metal nanoparticle composite body whose multiple properties, such as a good metal nanoparticle control property, high dispersion stability, a good low-temperature firing property, and ease of purifying and separating metal nanoparticles, are intentionally added and controlled so that practical electrical conductivity can be exhibited, a metal colloidal solution in which the metal nanoparticle composite body is dispersed, and methods for producing these.

Solution to Problem

The inventors of the present invention have conducted extensive studies to solve the above-described problems and found that the problems can be solved by using, as a compound used as a protecting agent for metal nanoparticles, a compound that has an oxidized nitrogen atom. Thus, the present invention has been made.

In other words, the present invention provides a metal nanoparticle composite body that contains a nitrogen-containing compound (A) and a metal nanoparticle (B), in which the nitrogen-containing compound (A) contains an oxidized nitrogen atom. Also provided are a metal colloidal solution in which the metal nanoparticle composite bodies are dispersed in a medium and methods for producing the metal nanoparticle composite bodies and the metal colloidal solution.

Advantageous Effects of Invention

A metal colloidal solution obtained in the present invention exhibits a good low-temperature firing property. As such, the conductive properties at low temperature are good since the compound used as the protecting agent for metal nanoparticles in the present invention easily and rapidly detaches from the surfaces of the metal nanoparticles at low temperature. Moreover, the particle size of the metal nanoparticles obtained in the presence of this specific protecting agent is sufficiently small and monodisperse, the particle size distribution is narrow, and thus the metal colloidal solution exhibits good storage stability. This is because the protecting agent includes a portion having an oxidized nitrogen atom and high coordinate bonding force to metal and protects the metal nanoparticles.

In producing a metal colloidal solution in the present invention, metal nanoparticles are obtained by reduction and impurities are removed by a purification/separation method step. In this step, composite bodies constituted by the metal nanoparticles and a protecting agent easily settle and separate by a simple operation of adding a poor solvent to a dispersion of the composite bodies. This is due to high association force of the protecting agent and complicated process, intricate condition settings, etc., are rarely needed. Accordingly, this process is advantageous as an industrial process.

The metal colloidal solution obtained in the present invention is formed into a metal foil having good conductivity, namely, a volume resistivity on the order of $10^{-6}$ Ωcm, by simply heating, at about 120° C., a thin film of the metal colloidal solution formed by applying the solution to a glass plate. This low-temperature conductive property is achieved because the functional group in the compound used as the protecting agent of the metal nanoparticles has a specific structure and coordinates to the particles and thus the protecting agent rapidly detach from the particle surfaces even at low temperature. Moreover, the average particle size of the metal nanoparticles contained in the metal nanoparticle composite bodies of the present invention is about 30 nm, the particle size distribution is narrow, and thus properties of an ink product containing the composite bodies can be maintained constant, improving storage stability. Accordingly, the metal colloidal solution is suitable for use as a conductive material in PE.

DESCRIPTION OF EMBODIMENTS

[Nitrogen-Containing Compound (A)]

In the present invention, a nitrogen-containing compound (A) that has a function of a protecting agent for metal nanoparticles (B) must have oxidized nitrogen atoms. Oxidized nitrogen atoms coordinate to a surface of a metal nanoparticle (B) that precipitates due to reduction of metal ions by a liquid phase reduction method and stabilize the metal nanoparticle (B), thereby preventing growth of metal. Moreover, when a thin film is formed, oxidized nitrogen atoms can rapidly detach from the metal surface at low temperature. Accordingly, oxidized nitrogen atoms play a major role in developing stability and conductivity by low-temperature firing, which are the objects of the present invention.

The form of the oxidized nitrogen atoms in the nitrogen-containing compound (A) is preferably one selected from N-oxide, N-hydroxide, nitrone, nitroso, or a nitro compound, for example. Two or more forms may be contained in the same compound.

The oxidized nitrogen atom content in the nitrogen-containing compound (A) is not particularly limited. However, nitrogen atoms are preferably oxidized at a stoichiometric amount corresponding to 0.5% or more of the total number of nitrogen atoms contained in the nitrogen-containing compound (A) since the nitrogen-containing compound (A) is easily obtained by the oxidation treatment described below, the storage stability of a colloidal solution in which the metal nanoparticle composite bodies are dispersed is improved, and high conductivity is developed by low-temperature firing.

The molecular weight of the nitrogen-containing compound (A) in terms of a weight-average molecular weight is preferably in the range of 500 to 200,000 and more preferably in the range of 1,000 to 100,000 from the viewpoint of a balance between the metal nanoparticle (B) protecting function and development of high-conductivity by low-temperature firing.

The method for synthesizing the nitrogen-containing compound (A) is not particularly limited. A method of oxidizing a precursor compound (a) containing nitrogen atoms as primary to tertiary amine functional groups by using an oxidizing agent (C) is preferred since oxidized nitrogen atoms can be easily incorporated into the nitrogen-containing compound (A).

The precursor compound (a) is not particularly limited. The precursor compound (a) is preferably a compound having a polyalkyleneimine structure and more preferably a compound having a polyethyleneimine structure. This is because when a relatively large number of nitrogen atoms are contained, the metal nanoparticle (B) protecting function is enhanced and it becomes possible to decrease the proportion of the nitrogen-containing compound (A) present in the metal nanoparticle composite bodies, thereby affecting conductivity less.

From the viewpoint of storage stability of a metal colloidal solution to be prepared therefrom, the nitrogen-containing compound (A) preferably has a portion having affinity for a medium. That is, the portion having affinity for a medium spreads in the solvent and prevents aggregation due to solvent affinity and Van der Waals repulsive force. This is one of the basic principles of the colloidal chemistry (refer to Kitahara & Furusawa "Saishin Koroido Kagaku [Latest Colloidal Chemistry]", Kodansha Scientific). The portion having affinity for the medium is preferably a polyalkylene oxide group and especially preferably a polyethylene oxide group if an aqueous medium is used.

In other words, the nitrogen-containing compound (A) and the precursor compound (a) used in the present invention are each most preferably a copolymer having a polyalkyleneimine portion and a polyalkylene oxide portion. They may each be a tertiary copolymer further having a hydrophobic portion.

Such compounds are already described in PTL 5 to PTL 7 as having an excellent silver nanoparticle protecting function in particular. In other words, it is already known that a compound in which a hydrophilic segment that includes a polyoxyethylene chain having a degree of polymerization of 3 to 3,000 is bonded to a branched polyethyleneimine chain having a degree of polymerization of 3 to 3,000 and a tertiary compound in which a hydrophobic polymer having a degree of polymerization of 3 to 3,000 is bonded to a branched polyethyleneimine chain having a degree of polymerization of 3 to 3,000 bonded to a hydrophilic segment that includes a polyoxyethylene chain having a degree of polymerization of 3 to 3,000 are effective as the protecting agents for silver colloids. The methods for producing these compounds are also provided in, for example, Japanese Unexamined Patent Application Publication No. 2006-241372.

However, the compounds described in these documents are far from perfect from the viewpoint of the capacity to provide a silver colloidal solution excelling as a conductive material. For example, it is described in PTL 5 that a $8.7 \times 10^{-4}$ $\Omega \cdot cm$-class conductive film was obtained by applying a dispersion of silver nanoparticle-containing composite bodies in a medium to a glass plate and firing the applied dispersion at 200° C. for 30 minutes. In PTL 6, a 4.7 to $7.6 \times 10^{-6}$ $\Omega \cdot cm$ conductive film is obtained by performing firing at 180° C. for 30 minutes. As such, high firing temperatures are required to develop conductivity. Accordingly, a heat-resistant material must be selected for the substrate and thus inexpensive commodity substrates such as polyesters cannot be selected, which is a problem. In other words, the present invention provides a material that develops high conductivity as a result of low-temperature treatment, which has not been realized with the compounds having the protective function provided in these documents, and that has high suitability for wiring materials.

From the industrial production viewpoint, a simple method for purifying and separating composite bodies in which metal nanoparticles produced by reducing a metal compound dissolved or dispersed in a medium are protected by the protecting agent is important. Preferably, a settling separation method in which a poor solvent, such as acetone, is added to the solution after reaction is employed. The oxidized nitrogen atom portions in the protecting agent used in the present invention promote rapid association among metal nanoparticle-containing composite bodies in environments ranging from a highly polar environment to a poor solvent environment and thus the composite bodies easily settle and become separated as they form large associated blocks.

In a firing process after a metal colloidal solution, which is a dispersion of metal nanoparticle-containing composite bodies, or a conductive material, which is a conductive ink prepared from this solution, is printed or applied to a substrate, the oxidized nitrogen atom portions in the protecting agent are easily decapped from the metal nanoparticle surfaces even at low temperatures because of their low binding force as with quaternary amines. Thus, a good low-temperature firing property is developed.

[Metal Nanoparticles (B)]

The metal nanoparticle (B) in the present invention may be any particles obtained by a liquid phase reduction method of metal ions and the type of metal is not particularly limited. From the viewpoints of versatility of conductive materials, conductivity, cost, and the like, gold, silver, platinum, and copper are preferable and silver is particularly preferable. From the viewpoint of precipitating the metal nanoparticle (B) by a liquid phase reduction method, the raw material is preferably a metal salt that has good solubility in a medium, in particular, an aqueous medium. Alternatively, the raw material may be a metal compound that dissolves in an aqueous medium in the presence of a complexing agent. From such viewpoints, nitrate salts, sulfate salts, phosphate salts, and the like of metals can be used as the raw material and insoluble compounds such as silver oxide may be dissolved along with an amine and used. The average particle size of the metal nanoparticles (B) is preferably in the range of 5 to 50 nm in terms of an average of 100 particles in a film obtained by casting the colloidal solution of the present invention as observed with a transmission electron microscope (TEM). The average particle size is preferably in the range of 20 to 50 nm since stability and the development of conductivity are particularly excellent.

[Oxidizing Agent (C)]

In the present invention, as discussed above, the nitrogen-containing compound (A) can be obtained by oxidizing a precursor compound (a) containing nitrogen atoms in the structure, particularly, as an amine functional group. Oxidation is preferably performed by a method of mixing a solution of the precursor compound (a) with an oxidizing agent (C) since it is simplest.

Compounds having a peroxide structure (—O—O— or —N—O—), such as peroxides, e.g., hydrogen peroxides, metal peroxides, inorganic peroxides or salts thereof and organic peroxy compounds, organic peroxides, and salts thereof are suitable for the oxidizing agent (C). A solution of the precursor compound (a) undergoes similar oxidation reaction when stored in air or oxygen for long time at a normal pressure or under pressure; thus, this process may be used.

An industrially supplied 30 to 50% aqueous hydrogen peroxide solution can be used as the hydrogen peroxide. Examples of the metal peroxides include sodium peroxide, potassium peroxide, lithium peroxide, magnesium peroxide, and zinc peroxide which are widely available. Examples of the inorganic peroxides and salts thereof include persulfuric acid, percarbonic acid, perphosphoric acid, hypochlorous acid, Oxone (registered trade mark of DuPont, an oxidizing agent containing potassium hydrogen persulfate as a main component), ammonium persulfate, sodium persulfate, potassium persulfate, and sodium percarbonate. Examples of the organic peroxy compounds, organic peroxides, and salts thereof include peracetic acid, perbenzoic acid, m-chloro benzoic acid, benzoyl peroxide, t-butyl peroxide, 1,2-dimethyldioxysilane, and Davis reagent (2-(phenylsulfonyl)-3-aryloxaziridine). These can be used. Among these oxidizing agents, a 30% aqueous hydrogen peroxide solution, ammonium persulfate, Oxone, and peracetic acid which are widely available and easy to handle are preferred.

[Reaction with Oxidizing Agent (C)]

The oxidizing agent (C) described above can donate one oxygen atom per mole of nitrogen atoms. A one-on-one reaction may be assumed for tertiary and secondary amines. Complication is expected for reaction with primary amines. The reaction is not limited to a reaction with one molecule of the oxidizing agent. A C-nitroso is formed when the primary amine reacts with a next molecule of the oxidizing agent and a nitro form is given by further oxidation. Accordingly, stoichiometrically, 3 moles of the oxidizing agent (C) can be consumed.

[Chem. 1]

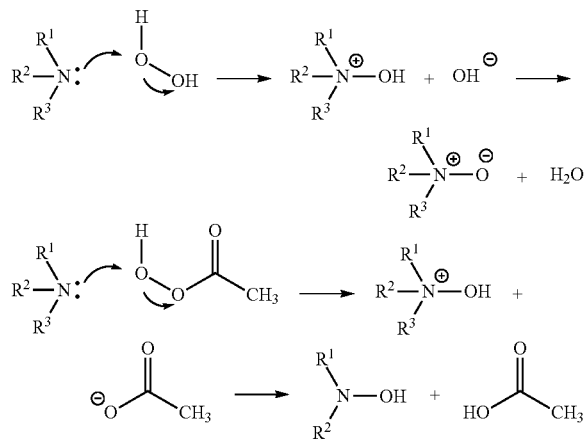

With these things in consideration, the amount of the oxidizing agent (C) is adjusted so that 0.5% or more of the total number of nitrogen atoms in the precursor compound (a) can be oxidized with the oxidizing agent (C).

[Structure of Nitrogen-Containing Compound (A)]

The precursor compound (a) used in the present invention is preferably a compound having a polyalkyleneimine structure as discussed above and preferably has a branched polyethyleneimine structure having a degree of polymerization of 3 to 3,000 since high water solubility is exhibited. From the viewpoint of ensuring dispersion stability of the colloidal solution, the compound having a branched polyethyleneimine is preferably copolymerized with a polyoxyethylene chain having a degree of polymerization of 3 to 3,000 and further with a hydrophobic polymer having a degree of polymerization of 3 to 3,000 so as to form a tertiary compound.

In a branched polyethyleneimine structure, tertiary, secondary, and primary amines are evenly and randomly contained. Considering the difference in nucleophilicity of nitrogen atoms belonging to these amines and large steric hindrance caused by presence of these amines in the polymer chain, it is not possible to clarify the selectivity of these different classes of amines for the oxidation reaction. Accordingly, it is presumed that when a sufficient amount of the oxidizing agent is reacted in an environment where these amines co-exist, tertiary amines are oxidized into amine oxides (C—N$^+$(O—)(—C)—C), secondary amines are oxidized into hydroxylamine (C—N(OH)—C) and nitrone (C=C—N$^+$(O—)—C) which is an oxide form of hydroxylamine, and primary amines are oxidized into hydroxylamine (C—NH(OH)), nitroso (C—NO), and nitro (C—NO$_2$) structures, such oxidations happening at random. In the case where hydroxylamine structures and amine oxide structures occur simultaneously, the former can reduce the latter to reproduce tertiary amines and hydroxylamine can be converted into nitroso compounds. Thus, presumably, these structures can also be contained (refer to reaction schemes below). Such a complicated state of oxidation affects the protecting property of the resulting protecting agent to some degree but there is no need to particularly consider the mixed state and use a single structure. Rather, it is preferable to oxidize branched polyalkyleneimine segments that are in such a mixed state from the viewpoints of storage stability of a metal colloidal solution to be obtained and low-temperature firing property of a film made by using the metal colloidal solution.

[Chem. 2]

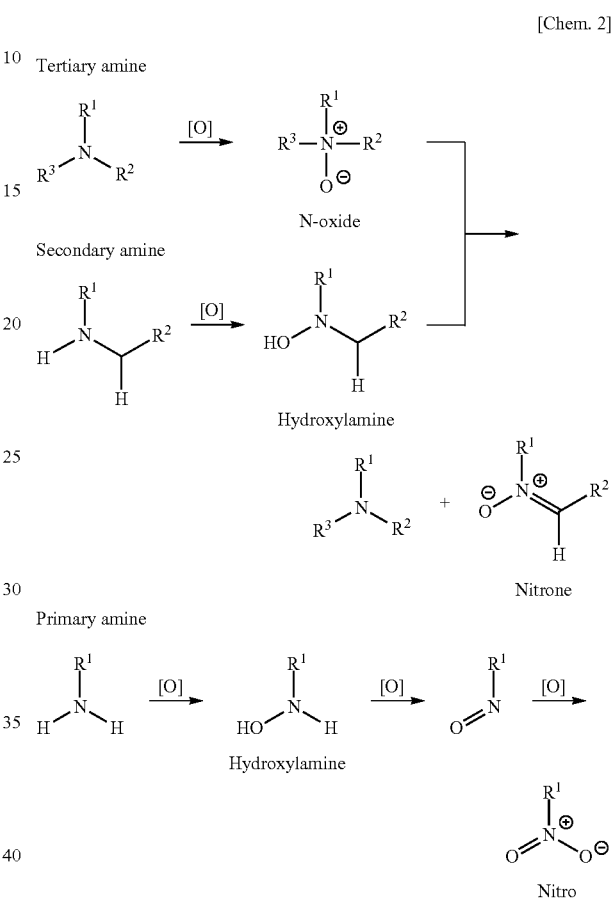

Examples of such a nitrogen-containing compound include developing solutions for silver halide photography or preservative of the developing solutions intended to replace diethylhydroxylamine. It is disclosed that poly(N-hydroxyl alkeneimine) (Chem. 3) is contained as the oxidized polymer structure (for example, refer to Japanese Unexamined Patent Application Publication No. 6-273905).

[Chem. 3]

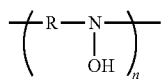

Since a hydroxylamine acts as a reducing agent, it causes coloring of a reducing indicator such as 2,3,5-triphenyl tetrazolium chloride (TTC). In the present invention also, when a nitrogen-containing compound (A) obtained by oxidation was mixed with TTC, a strong red color derived from triphenylformazan was developed. Coloring was also confirmed with a nitrogen-containing compound treated with a small amount, that is, about 0.5%, of the oxidizing agent and presence of the hydroxylamine structure was confirmed.

In the case where hydrogen peroxide is used as an oxidizing agent for a tertiary amine, action is preferably enhanced by adding a catalyst such as a transition metal, a metal porphyrin complex, or flavin, to improve the reaction speed. In contrast, the reaction of a secondary amine is known to occur rapidly and thus when different classes of amines are mixed as in the nitrogen-containing compound of the present invention, it is presumed that the oxidation of secondary amines occurs preferentially. In particular, in the case where the oxidizing agent (C) is used in an amount corresponding to 0.5 to 10% of the total number of nitrogen atoms, it is presumed from the analytical results of $^1$H-NMR that hydroxylamine polymers occur primarily and N-oxide only occurs secondarily.

[Methods for Producing Metal Nanoparticle Composite Bodies and Colloidal Solution which is a Dispersion of the Composite Bodies]

A method for producing a metal colloidal solution of the present invention includes reducing metal ions in a solution or dispersion of the nitrogen-containing compound (A) working as a protecting agent described above to form metal nanoparticles. Examples of the source of the metal ions include metal salts or metal ion solutions. The source of the metal ions may be any water-soluble metal compound. For example, salts of metal cations and radical anions and radical anions containing metal can be used and preferably, metal ions having metal species such as transition metals are used.

Transition metal-based ions may be transition metal cations ($M^{n+}$) or anions ($ML_x^{n-}$) containing halogen bonds. In either case, the ions can be favorably coordinated in a complex state. Note that in this specification, transition metals refer to transition metal elements belonging to groups 4 to 12 and periods 4 to 6 of the periodic table.

Examples of the transition metal cations include cations ($M^{n+}$) of the transition metals described below. Examples thereof include monovalent, divalent, trivalent, or tetravalent cations of Cr, Co, Ni, Cu, Pd, Ag, Pt, or Au. The counter anion of these metal cations may be any one of Cl, $NO_3$, $SO_4$, and an organic anion such as, carboxylic acid.

Anions ($ML_x^{n-}$) containing metals, e.g., anions in which metal is coordinated to a halogen such as $AgNO_3$, $AuCl_4$, $PtCl_4$, and $CuF_6$, can also be favorably coordinated in a complex state.

Of these metal ions, silver, gold, and platinum ions are particularly preferable since they are spontaneously reduced at room temperature or in a heated state and turn into nonionic metal nanoparticles. In the case where a metal colloidal solution obtained is to be used as a conductive material, silver ions are preferably used from the viewpoint of capacity to develop conductivity and prevention of oxidation of the film obtained by printing and applying the metal colloidal solution.

Two or more types of metals can be contained. In such a case, salts or ions of two or more types of metals are added simultaneously or separately so that two or more types of metal ions undergo reduction reaction in the medium and two or more types of metal particles are generated. As a result, a colloidal solution containing two or more types of metal can be obtained.

In the present invention, the metal ions may be further reduced by using a reducing agent.

Various reducing agents can be used as the reducing agent and there is no limitation. The reducing agent is preferably selected according to the usage of the metal colloidal solution to be obtained, types of metal to be contained, etc. Examples of the reducing agent that can be used include hydrogen, boron compounds such as sodium borohydride and ammonium borohydride, alcohols such as methanol, ethanol, propanol, isopropyl alcohol, ethylene glycol, and propylene glycol, aldehydes such as formaldehyde, acetaldehyde, and propionaldehyde, acids such as ascorbic acid, citric acid, and sodium citrate, amines such as propylamine, butylamine, diethylamine, dipropylamine, dimethylethylamine, triethylamine, ethylenediamine, triethylenetramine, methylaminoethanol, dimethylaminoethanol, and triethanolamine, and hydrazines such as hydrazine and hydrazine carbonate. Among these, sodium borohydride, ascorbic acid, sodium citrate, methylaminoethanol, dimethylaminoethanol, and the like are preferred due to industrial availability, ease of handling, etc.

In the method for producing a metal colloidal solution of the present invention, the proportions of using the nitrogen-containing compound (A) serving as a protecting agent and the source of metal ions are not particularly limited. Assuming that the total number of nitrogen atoms in the protecting agent is 100 mol, the amount of metal is usually in the range of 1 to 20,000 mol, preferably in the range of 1 to 10,000 mol, and more preferably in the range of 50 to 7,000 mol.

In the method for producing a metal colloidal solution according to the present invention, the method for mixing a medium in which the protecting agent is dispersed or dissolved with a metal salt or ion solution is not particularly limited. A method including adding a metal salt or ion solution to a medium in which the protecting agent is dispersed or dissolved, a method including adding the medium to the metal salt or ion solution, or a method including charging the medium and the metal salt or ion solution into another container at the same time may be employed. The mixing method such as stirring is not particularly limited.

The method for adding the reducing agent is not particularly limited. For example, a reducing agent may be directly added as is, or dissolved or dispersed in an aqueous solution or another solvent and then added. The order in which the reducing agent is added is also not limited. The reducing agent may be added to a solution or dispersion of a protecting agent in advance or added at the same time as mixing the metal salt or ion solution. Alternatively, the reducing agent may be mixed several days or several weeks after the solution or dispersion of the protecting agent is mixed with the metal salt or ion solution.

In adding a metal salt or ion solution used in the production method of the present invention to a medium in which the protecting agent is dispersed or dissolved, the metal salt or ion solution may be directly added or may be prepared into an aqueous solution and then added irrespective of whether the system is O/W or W/O. Metal ions of silver, gold, palladium, platinum, or the like coordinate to the oxidized nitrogen atom structure portion in the protecting agent and then are spontaneously reduced at room temperature or under heating. Thus, metal nanoparticles are formed at room temperature or under heating by settling or stirring and a metal colloidal solution which is a dispersion of composite bodies protected with the protecting agent can be obtained. However, in order to efficiently reduce metal ions, a reducing agent is preferably used as described above, and a metal colloidal solution is obtained at room temperature or under heating by settling or stirring. During this process, the reducing agent is preferably used as is or prepared into an aqueous solution. The temperature of the heating differs depending on the type of the protecting agent, the types of the metal, medium, and reducing agent, etc.; however, the temperature is usually 100° C. or less and preferably 80° C. or less.

As discussed above, as the metal ions are reduced, metal nanoparticles are precipitated and the surfaces of the particles are protected with the protecting agent and stabilized. The solution after the reduction reaction contains impurities such as the reducing agent, counter ions of metal ions, nitrogen-containing compound (A) not used in protecting the metal nanoparticles, etc., and does not exhibit sufficient properties of conductive materials as is. Accordingly, a purification step is needed to remove the impurities and the like. The nitrogen-containing compound (A) used in the present invention has high protecting capacity and thus it is possible to efficiently settle the composite bodies, which are metal nanoparticles protected with the protecting agent, by adding a poor solvent to the reaction solution. The settled composite bodies can be concentrated or isolated by a centrifugal separation step or the like. After the concentration, the nonvolatile content (concentration) is adjusted with a desired medium depending on the usage of the metal colloidal solution and the resulting product is used in various usages.

Examples of the purification step for removing the impurities and the like include common purification methods such as dialysis, microfiltration, and ultrafiltration.

Specific means for ultrafiltration is not particularly limited. A cross-flow method that uses flat-sheet membranes or a hollow fiber module is typically employed as an industrial method. The same technique can also be used in the present invention. The crude reaction solution may be fed and circulated in an ultrafiltration unit to remove the substances to be removed as a permeate. Continuing the ultrafiltration by incessantly adding purified water in an amount corresponding to the amount of the permeate will give a metal colloidal solution in which the content of the undesirable substances is sufficiently decreased. If addition of the purified water is stopped, the concentration can also be adjusted. Once the removal of water-soluble undesirable substances is finished, ultrafiltration is further continued by adding a water-soluble organic solvent such as ethanol and a nonaqueous metal colloidal solution can be obtained eventually.

Polyacrylonitrile, polyether sulfone, cellulose acetate, etc., are generally used as the membrane material for ultrafiltration and these may be used. When switching to an organic solvent is to be performed, polyether sulfone is a good choice from the viewpoint of durability. Various molecular weight cut-offs are known and thus one suitable for the size of the metal nanoparticle to be obtained may be selected. Usually, a membrane with a molecular weight cut-off of about 3,000 to 800,000 can be used and a membrane having a molecular weight cut-off of 150,000 is preferred since leakage of metal nanoparticles is less and filtration resistance is low.

[Metal Colloidal Solution]

Metal nanoparticle composite bodies are dispersed in water or an organic solvent to form a metal colloidal solution as described in the purification method. The concentration and the solvent system of this solution can be changed depending on the purpose. Examples of the organic solvent include alcohols such as methanol, ethanol, isopropyl alcohol, and n-propyl alcohol and glycols such as ethylene glycol, propylene glycol, ethylene glycol monomethyl ether, and propylene glycol monomethyl ether. These organic solvents can be used alone or as a mixture of two or more, or may be mixed with water and used. The concentration (nonvolatile content) of the metal nanoparticle composite bodies in the solution can be appropriately selected depending on the usage but is usually preferably 10 to 85% by mass. The concentration is preferably adjusted to be in the range of 20 to 70% mass from the viewpoint of ease of drying at room temperature and improved conductivity of the metal film to be obtained. The metal nanoparticle content in the nonvolatile component is adjusted to 90% by mass or more and preferably 95% by mass or more to easily develop conductivity.

In general, metal nanoparticles in a size region of several tens of nanometers have characteristic optical absorptions attributable to surface plasmon excitation dependent on the type of metal. Thus, whether the metal in the solution exists as nanometer-order fine particles in the metal colloidal solution of the present invention can be confirmed by measuring the plasmon absorption of the colloidal solution. Moreover, the average particle size, the distribution width, etc., can be observed from a TEM (transmission electron microscope) image or the like of a film formed by casting the solution.

A metal thin film can be directly obtained from the obtained metal colloidal solution of the present invention by using various application methods. Furthermore, additives, surfactants, etc., suitable for various printing methods (ink jet, reverse printing, etc.) can be mixed and wiring can be fabricated by printing the resulting mixture onto various substrates.

EXAMPLES

The present invention will now be described by using Examples. Unless otherwise noted, "%" is on a mass basis.

[Confirmation of Structure of Nitrogen-Containing Compound (A) by $^1$H-NMR]

About 3 mL of a solution of a compound was concentrated and thoroughly dried at reduced pressure and then the residue was dissolved in about 0.8 mL of a 0.03% tetramethylsilane-containing deuteriochloroform. The resulting solution was placed in a glass NMR measurement sample tube having an outer diameter of 5 mm and a $^1$H-NMR spectrum was obtained with JEOL JNM-LA300 nuclear magnetic resonance absorption spectrometer. The reference substance for the chemical shift value δ was tetramethylsilane.

[Particle Size Measurement by Dynamic Light Scattering Method]

A portion of the metal colloidal solution was diluted with purified water. The particle size distribution and the average particle size were measured with FPAR-1000 concentrated-system particle size analyzer (Otsuka Electronics Co., Ltd.).

[Measurement of Metal Content in Nonvolatile Component by Thermogravimetric Analysis]

About 1 mL of the metal colloidal solution was placed in a glass sample jar and concentrated under heating in a nitrogen stream on a boiling water bath. The residue was vacuum dried at 50° C. for 8 hours or more to obtain a nonvolatile component. Into an aluminum pan for thermogravimetric analysis, 2 to 10 mg of the nonvolatile component was accurately weighed and the aluminum pan was loaded in EXSTAR TG/DTA6300 thermogravimetry/differential thermal analyzer (produced by Seiko Instruments Inc.). The temperature was increased from room temperature to 500° C. at a rate of 10° C. per minute under air stream and the decrease in weight associated with heating was measured. The metal content in the nonvolatile component was calculated from the equation below:

Metal content (%)=100−decrease in weight (%)

[Measurement of Resistivity of Metal Thin Film Obtained from Metal Colloidal Solution]

About 0.5 mL of the metal colloidal solution was dropped onto an upper portion of a 2.5×5 cm clean glass plate and formed into a film using a bar coater No. 8. The film was air-dried and then heated for 30 minutes in a hot-air drier at 120° C., 150° C., 180° C., and 250° C. to form a fired film. The thickness of the fired film was measured with OPTEL-ICS C130 real color confocal microscope (produced by Lasertec Corporation) and then the surface resistivity ($\Omega/\square$) was measured with Loresta EP MCP-T360 low resistivity meter (produced by Mitsubishi Chemical Corporation) in accordance with JIS K7194 "Testing method for resistivity of conductive plastics with a four-point probe array". The thickness of the film was substantially constant at about 0.3 μm under the aforementioned conditions and the volume resistivity ($\Omega$cm) was calculated from the thickness and the surface resistivity ($\Omega/\square$) using the equation below:

Volume resistivity ($\Omega$cm)=surface resistivity ($\Omega/\square$)× thickness (cm)

Synthetic Example 1 (Synthesis of Tosylated Polyethylene Glycol Monomethyl Ether)

Into a solution of 25.0 g [12.9 mmol] of polyethylene glycol monomethyl ether (PEGM, number-average molecular weight (Mn): 2000) and 24 g (300 mmol) of pyridine in 150 ml of chloroform, 7.36 g (38.6 mmol) of tosyl chloride was added, and the resulting mixture was stirred overnight at room temperature. Pyridine was distilled off from the reaction mixture at a reduced pressure, 150 mL of chloroform was added to the residue to dilute the residue, and the diluted mixture was washed with 250 mL (340 mmol) of a 5% aqueous HCl solution, then with saturated brine, and then with water. The resulting chloroform solution was dried over sodium sulfate, the solvent was distilled off with an evaporator, and the residue was further dried at a reduced pressure. As a result, 23.6 g of white solid was obtained (85% yield).

$^1$H-NMR (CDCl3): δ (ppm)=7.8 (d, 2H, J=7.8 Hz, tosyl group), 7.3 (d, 2H, J=7.8, tosyl group), 4.2 (t, 2H, J=4.2 Hz, next to sulfonate ester), 3.6-3.5 (m, PEGM methylene), 3.4 (s, 3H, methoxy group at PEGM chain terminal), 2.4 (s, 3H, tosyl group methyl)

Synthetic Example 2 (Synthesis of Precursor Compound a-1: Polyethyleneimine-b-Polyethylene Glycol Compound)

In 180 ml of N,N-dimethylacetamide, 23.2 g (1.1 mmol) of tosylated polyethylene glycol obtained in Synthetic Example 1 and 15.0 g (1.5 mmol) of branched polyethyleneimine (EPOMIN SP200 produced by Nippon Shokubai Co., Ltd.) were dissolved. To the resulting solution, 0.12 g of potassium carbonate was added and the mixture was stirred in a nitrogen atmosphere at 100° C. for 6 hours. Upon completion of the reaction, solid matter was removed and reduced-pressure concentration was performed at 70° C. A mixture of 150 ml of ethyl acetate and 450 ml of hexane was added to the residue and precipitates were obtained. The precipitates were dissolved in 100 ml of chloroform and a mixed solvent containing 150 ml of ethyl acetate and 450 ml of hexane was again added to perform resettling. The resulting product was separated by filtration and dried at a reduced pressure. As a result, a pale yellow solid material was obtained (36.1 g (yield: 97%)).

$^1$H-NMR (CDCl3): δ (ppm)=3.6 (m, PEGM methylene), 3.3 (s, 3H, methoxy group at PEGM chain terminal), 2.7 to 2.3 (m, branched PEI ethylene)

Synthetic Example 3 (Precursor Compound a-2: Polyethyleneimine-b-Polyethylene Glycol-b-Bisphenol A Epoxy Resin)

In 100 mL of N,N-dimethylacetamide, 37.4 g (20 mmol) of EPICLON AM-040-P (produced by DIC Corporation) and 2.72 g (16 mmol) of 4-phenylphenol were dissolved, a 0.52 mL of a 65% ethyltriphenylphosphonium acetate solution in ethanol was added to the resulting solution, and the resulting mixture was reacted at 120° C. for 6 hours in a nitrogen atmosphere. After the mixture was left to cool, the mixture was added to a large quantity of water dropwise and the precipitates obtained were washed with a large quantity of water. The residue was dried at reduced pressure. As a result, a modified bisphenol A epoxy resin was obtained. The yield of the product was 100%.

$^1$H-NMR measurement was conducted to investigate the integral ratio for epoxy groups. It was confirmed that 0.95 epoxy rings remained per molecule of the bisphenol A epoxy resin and that the product was a monofunctional epoxy resin having a bisphenol A skeleton.

To a methanol (150 mL) solution of 20 g (0.8 mmol) of the polyethyleneimine-b-polyethylene glycol compound obtained in Synthetic Example 2, an acetone (50 mL) solution of 4.9 g (2.4 mmol) of the modified epoxy resin was added dropwise in a nitrogen atmosphere, and the resulting mixture was stirred at 50° C. for 2 hours. Upon completion of the reaction, the solvent was distilled off at reduced pressure and the residue was dried at reduced pressure. As a result, a polyethyleneimine-b-polyethylene glycol-b-bisphenol A epoxy resin was obtained. The yield was 100%.

$^1$H-NMR (CDCl$_3$): δ (ppm)=7.55 to 6.75 (m), 4.40 to 3.90 (m), 3.33 (m), 2.89 (m), 2.73 (m), 1.62 (s)

Example 1 (Synthesis of Silver Colloidal Solution by Using Nitrogen-Containing Compound Prepared by Oxidizing Precursor Compound a-1 with Ammonium Persulfate)

The precursor compound a-1 (3.24 g) obtained in Synthetic Example 2 was dissolved in 10 mL of water and ammonium persulfate (108 mg, 0.48 mmol, equivalent to 1% of N atoms) was added to the resulting solution. The mixture was then stirred for 1 hour at room temperature and left to stand overnight.

One drop of the polymer solution obtained was added to 10 mL of purified water and about 1 mg of 2,3,5-triphenyltetrazolium chloride was added thereto and dissolved by shaking. The mixture immediately developed reduction color (red). Thus, it was confirmed that N—OH was contained in the polymer structure.

About 3 mL of the polymer solution obtained was concentrated and dried at reduced pressure and then the residue was dissolved in deuteriochloroform to measure $^1$H-NMR. Broad signals not found before the oxidation were observed at 8.0 ppm, 3.3 ppm, and 2.9 ppm. The signal at 8.0 ppm was assigned to N-hydroxyl groups, and the signals of the latter two were assigned to methylene protons adjacent to the oxidized nitrogen, respectively.

$^1$H-NMR (CDCl$_3$): δ (ppm)=8.0 (br, N—OH), 3.6 (m, PEGM methylene), 3.3 (br, methylene next to NH—OH or methylene next to N═O), 3.3 (s, 3H, methoxy group at PEGM chain terminal), 2.9 (br, methylene next to N—OH), 2.7 to 2.3 (m, branched PEI ethylene)

The obtained polymer solution was diluted with 400 mL of purified water and N,N-dimethylaminoethanol (113 g, 1.27 mol) was added to the diluted solution to prepare a protecting agent-reducing agent solution. Silver nitrate (72.0 g, 0.424 mol) was dissolved in 120 mL of purified water to separately prepare an aqueous silver nitrate solution.

The aqueous silver nitrate solution was added dropwise to the protecting agent-reducing agent solution at room temperature over 30 minutes, followed by stirring at 50° C. for 3 hours. After cooling, acetone (2.3 L) was added and the resulting mixture was stirred. Precipitates generated were separated by centrifugal separation. The precipitates were again dispersed by adding 140 mL of water, the remaining acetone was distilled off, and the resulting mixture was concentrated at reduced pressure until the nonvolatile content was about 30%. As a result, silver colloidal solution was obtained (146 g as a water dispersion, 43.8 g as a nonvolatile component, pure silver content: 96.5%, yield: 92%). The evaluation results of this silver colloidal solution are shown in Table 1.

Examples 2 and 3 (Synthesis of Silver Colloidal Solution by Using Nitrogen-Containing Compound Prepared by Oxidizing Precursor Compound a-1 with Ammonium Persulfate)

The precursor compound a-1 (3.24 g) obtained in Synthetic example 2 was dissolved in 10 mL of water and ammonium persulfate (216 mg, 0.95 mmol, equivalent to 2% of N atoms (Example 2) or 540 mg, 2.37 mmol, equivalent to 5% of N atoms (Example 3)) was added to the solution. The mixture was stirred at room temperature for 1 hour and left to stand overnight. The rest of the process was the same as in Example 1 and a silver colloidal solution with concentration of about 30% was obtained (Example 2: 140 g as a water dispersion, 42.1 g as a nonvolatile component, pure silver content: 97.0%, yield: 89%; Example 3: 142 g as a water dispersion, 42.5 g as a nonvolatile component, pure silver content: 96.8%, yield: 90%).

Example 4 (Synthesis of Silver Colloidal Solution by Using Nitrogen-Containing Compound Prepared by Oxidizing Precursor Compound a-1 with 30% Aqueous Hydrogen Peroxide Solution)

The precursor compound a-1 (3.24 g) obtained in Synthetic Example 2 was dissolved in 10 mL of water and a 30% aqueous hydrogen peroxide solution (108 mg, 0.95 mmol, equivalent to 2% of N atoms) was added to the solution. The mixture was stirred for 1 hour at room temperature and left to stand overnight. The rest of the process was the same as in Example 1. As a result, a silver colloidal solution having a concentration of about 30% was obtained (140 g as a water dispersion, 42.1 g as a nonvolatile component, pure silver content: 97.0%, yield: 89%).

Example 5

After 36.6 g of the precursor compound a-1 obtained in Synthetic Example 2 was dissolved in 100 mL of pure water, 5.68 g (58.4 mmol, 11 mol % relative to N equivalent) of a 35% aqueous hydrogen peroxide solution was slowly added to the resulting solution under stirring in an ice bath to perform oxidation reaction for 5 hours.

Measurement results of $^1$H-NMR and $^{13}$C-NMR (AL300 produced by JEOL Ltd., 300 MHz) and elemental analysis of the obtained product are as follows.

Measurement results of $^1$H-NMR (DMSO-$d_6$):

δ (ppm)=3.6 (m, PEGM methylene), 3.3 to 3.2 (m, N-oxide ethylene), 3.25 (s, 3H, methoxy group at PEGM chain terminal), 2.9 (m, N-oxide ethylene), 2.7 to 2.4 (m, branched PEI ethylene).

Measurement results of $^{13}$C-NMR (DMSO-$d_6$):

δ (ppm)=36.0 (m, N-oxide ethylene), 39.0 (m), 43.0 (m, N-oxide ethylene), 46.0 (m), 48.0 (m), 51.0 (m), 53.0 (m), 56.0 (m), 59.0 (s), 63.0 to 68.0 (m, N-oxide ethylene), 70.0 (m), 71.5 (s).

Measurement results of elemental analysis: C (52.9%), H (10.0%), N (17.5%)

In the branched PEI ethylene at 2.40 to 2.70 ppm in $^1$H-NMR measurement, the tertiary amine peak at 2.40 to 2.55 ppm in a relatively high magnetic field decreased and the integral ratio thereof also decreased in response; however, the peaks of secondary amines at 2.55 to 2.60 ppm and primary amines at 2.60 to 2.70 ppm remained substantially unchanged. In the measurement results of $^{13}$C-NMR also, the tertiary amine peak at 51.0 to 56.0 ppm decreased but the peaks of secondary and primary amines at 39.0 to 51.0 ppm remained substantially unchanged. It was presumed from the elemental analysis and the NMR integral ratios that about 11.0 to 15.0% of all nitrogen atoms (N) in the precursor compound were oxidized into N-oxides.

Into a 1 L reactor, 180 g of pure water, 13.5 g of an aqueous solution of the product obtained as above, and 113 g (1.27 mol) of N,N-dimethylaminoethanol were sequentially added and stirred to prepare a mixed solution containing a protecting agent and a reducing agent. Separately, 72.0 g (0.424 mol) of silver nitrate was dissolved in 120 g of pure water and the resulting aqueous silver nitrate solution was added dropwise to the mixed solution at room temperature over about 30 minutes. The resulting mixture was then stirred at 40° C. for 4 hours. After termination of reaction and cooling, 1.4 L (about three times the volume of the reaction mixed solution) of acetone serving as a poor solvent was added to the resulting mixture and the mixture was stirred for 5 minutes. Composite bodies of silver nanoparticles and the protecting agent were settled and separated by being left to stand still for about 1 hour. After the supernatant was removed, the generated precipitates were separated by centrifugal separation. To paste-like precipitates obtained by the centrifugal separation, 80 g of pure water was added and the precipitates were thoroughly dispersed. The remaining acetone was distilled off by debinding and the product was concentrated at reduced pressure until the nonvolatile content was about 60%. As a result, 77.0 g of an aqueous silver colloidal solution was obtained (46.0 g as a nonvolatile component, yield: 96%). Thermal analysis (Tg/DTA) found that the silver content in the nonvolatile component was 96.0%.

Example 6

In 100 mL of pure water, 36.6 g of the polyethyleneimine-b-polyethylene glycol copolymer, which is a precursor obtained in Synthetic Example 2, was dissolved. Under stirring, 15.5 g (159.3 mmol, 30 mol % relative to N equivalent) of a 35% aqueous hydrogen peroxide solution was slowly added to the resulting solution in an ice bath and oxidation reaction was performed for 5 hours.

Measurement results of $^1$H-NMR and $^{13}$C-NMR (AL300 produced by JEOL Ltd., 300 MHz) and elemental analysis of the obtained product are as follows.

Measurement results of $^1$H-NMR (DMSO-d$_6$):

δ (ppm)=3.6 (m, PEGM methylene), 3.3 to 3.2 (m, N-oxide ethylene), 3.25 (s, 3H, methoxy group at PEGM chain terminal), 2.9 (m, N-oxide ethylene), 2.7 to 2.4 (m, branched PEI ethylene).

Measurement results of $^{13}$C-NMR (DMSO-d$_6$):

δ (ppm)=36.0 (m, N-oxide ethylene), 39.0 (m), 43.0 (m, N-oxide ethylene), 46.0 (m), 48.0 (m), 51.0 (m), 53.0 (m), 56.0 (m), 59.0 (s), 63.0 to 68.0 (m, N-oxide ethylene), 70.0 (m), 71.5 (s).

Measurement results of elemental analysis: C (52.5%), H (10.1%), N (16.2%)

In the branched PEI ethylene at 2.40 to 2.70 ppm in $^1$H-NMR measurement, the tertiary amine peak at 2.40 to 2.55 ppm in a relatively high magnetic field substantially disappeared and the peaks of secondary amines at 2.55 to 2.60 ppm and primary amines at 2.60 to 2.70 ppm decreased, resulting in a decrease in the integral ratio thereof. In the measurement results of $^{13}$C-NMR also, the tertiary amine peak at 51.0 to 56.0 ppm substantially disappeared and the peaks of secondary and primary amines at 39.0 to 51.0 ppm decreased. It was presumed from the elemental analysis and the NMR integral ratios that about 30.0 to 39.0% of all nitrogen atoms (N) in the precursor compound were oxidized into N-oxides.

The same process as in Example 5 was performed except that 14.5 g of an aqueous solution of the compound obtained as above was used. As a result, 73.0 g of an aqueous silver colloidal solution having a nonvolatile content of about 60% was obtained (45.6 g as a nonvolatile component, yield: 95%). Thermal analysis (Tg/DTA) found that the silver content in the nonvolatile component was 96.2%.

Example 7

In 100 mL of pure water, 36.6 g (N equivalent, 531 mmol) of the polyethyleneimine-b-polyethylene glycol copolymer, which is a precursor obtained in Synthetic Example 2, was dissolved. Under stirring, 25.8 g (265.5 mmol, 50 mol % relative to N equivalent) of a 35% aqueous hydrogen peroxide solution was slowly added to the resulting solution in an ice bath and oxidation reaction was performed for 5 hours.

Measurement results of $^1$H-NMR, $^{13}$C-NMR, and $^{15}$N-NMR (AL300 produced by JEOL Ltd., 300 MHz) and elemental analysis of the obtained product are as follows.

Measurement results of $^1$H-NMR (DMSO-d$_6$):

δ (ppm)=3.6 (m, PEGM methylene), 3.3 to 3.2 (m, N-oxide ethylene), 3.25 (s, 3H, methoxy group at PEGM chain terminal), 2.9 (m, N-oxide ethylene), 2.7 to 2.5 (m, branched PEI ethylene).

Measurement results of $^{13}$C-NMR (DMSO-d$_6$):

δ (ppm)=36.0 (m, N-oxide ethylene), 39.0 (m), 43.0 (m, N-oxide ethylene), 46.0 (m), 48.0 (m), 51.0 (m), 53.0 (m), 59.0 (s), 63.0 to 68.0 (m, N-oxide ethylene), 70.0 (m), 71.5 (s).

Measurement results of $^{15}$N-NMR (DMSO-d$_6$):

δ (ppm)=15.0 (m), 20.0 to 30.0 (m), 112.0 to 120.0 (m, N-oxide ethylene), 128.0 to 132.0 (m, N-oxide ethylene).

Measurement results of elemental analysis: C (50.9%), H (9.8%), N (15.9%)

In the branched PEI ethylene at 2.40 to 2.70 ppm in $^1$H-NMR measurement, the tertiary amine peak at 2.40 to 2.55 ppm in a relatively high magnetic field disappeared and the peaks of secondary amines at 2.55 to 2.60 ppm and primary amines at 2.60 to 2.70 ppm decreased, resulting in a decrease in the integral ratio thereof. In the measurement results of $^{13}$C-NMR also, the tertiary amine peak at 51.0 to 56.0 ppm disappeared and the peaks of secondary and primary amines at 39.0 to 51.0 ppm decreased. In the measurement results of $^{15}$N-NMR also, the tertiary amine peak at 30.0 to 33.0 ppm disappeared and the peaks of secondary amines at 20.0 to 30.0 ppm and primary amines at 15.0 ppm decreased. It was presumed from the elemental analysis and the NMR integral ratios that about 50.0 to 61.0% of all nitrogen atoms (N) in the precursor compound were oxidized into N-oxides.

The same process as in Example 5 was performed except that 15.5 g of an aqueous solution of the compound obtained as above was used. As a result, 74.0 g of an aqueous silver colloidal solution having a nonvolatile content of about 60% was obtained (46.0 g as a nonvolatile component, yield: 96%). Thermal analysis (Tg/DTA) found that the silver content in the nonvolatile component was 95.8%.

Example 8

In 100 mL of pure water, 36.6 g (N equivalent, 531 mmol) of the polyethyleneimine-b-polyethylene glycol copolymer, which is a precursor obtained in Synthetic Example 2, was dissolved. Under stirring, 36.1 g (371.7 mmol, 70 mol % relative to N equivalent) of a 35% aqueous hydrogen peroxide solution was slowly added to the resulting solution in an ice bath and oxidation reaction was performed for 5 hours.

Measurement results of $^1$H-NMR and $^{13}$C-NMR (AL300 produced by JEOL Ltd., 300 MHz) and elemental analysis of the obtained product are as follows.

Measurement results of $^1$H-NMR (DMSO-d$_6$):

δ (ppm)=3.6 (m, PEGM methylene), 3.3 to 3.2 (m, N-oxide ethylene), 3.25 (s, 3H, methoxy group at PEGM chain terminal), 2.9 (m, N-oxide ethylene), 2.70 to 2.55 (m, branched PEI ethylene).

Measurement results of $^{13}$C-NMR (DMSO-d$_6$):

δ (ppm)=36.0 (m, N-oxide ethylene), 39.0 (m), 43.0 (m, N-oxide ethylene), 46.0 (m), 48.0 (m), 51.0 (m), 59.0 (s), 63.0 to 68.0 (m, N-oxide ethylene), 70.0 (m), 71.5 (s).

Measurement results of elemental analysis: C (49.6%), H (9.3%), N (15.1%)

In the branched PEI ethylene at 2.40 to 2.70 ppm in $^1$H-NMR measurement, the tertiary amine peak at 2.40 to 2.55 ppm in a relatively high magnetic field disappeared and the peaks of secondary amines at 2.55 to 2.60 ppm and primary amines at 2.60 to 2.70 ppm substantially disappeared. In the measurement results of $^{13}$C-NMR also, the tertiary amine peak at 51.0 to 56.0 ppm disappeared and the peaks of secondary and primary amines at 39.0 to 51.0 ppm substantially disappeared. It was presumed from the elemental analysis and the NMR integral ratios that about 70.0 to 76.0% of all nitrogen atoms (N) in the precursor compound were oxidized into N-oxides.

The same process as in Example 5 was performed except that 16.4 g of an aqueous solution of the compound obtained as above was used. As a result, 75.0 g of an aqueous silver colloidal solution having a nonvolatile content of about 60% was obtained (45.1 g as a nonvolatile component, yield: 94%). Thermal analysis (Tg/DTA) found that the silver content in the nonvolatile component was 96.3%.

Example 9

In 100 mL of pure water, 36.6 g (N equivalent, 531 mmol) of the polyethyleneimine-b-polyethylene glycol copolymer, which is a precursor obtained in Synthetic Example 2, was dissolved. Under stirring, 51.6 g (531.0 mmol, 100 mol % relative to N equivalent) of a 35% aqueous hydrogen peroxide solution was slowly added to the resulting solution in an ice bath and oxidation reaction was performed for 5 hours.

Measurement results of $^1$H-NMR and $^{13}$C-NMR (AL300 produced by JEOL Ltd., 300 MHz) and elemental analysis of the obtained product are as follows.

Measurement results of $^1$H-NMR (DMSO-$d_6$):

δ (ppm)=3.6 (m, PEGM methylene), 3.3 to 3.2 (m, N-oxide ethylene), 3.25 (s, 3H, methoxy group at PEGM chain terminal), 2.9 (m, N-oxide ethylene).

Measurement results of $^{13}$C-NMR (DMSO-$d_6$):

δ (ppm)=36.0 (m, N-oxide ethylene), 43.0 (m, N-oxide ethylene), 48.0 (m), 59.0 (s), 63.0 to 68.0 (m, N-oxide ethylene), 70.0 (m), 71.5 (s).

Measurement results of elemental analysis: C (48.0%), H (8.8%), N (14.1%)

In the branched PEI ethylene at 2.40 to 2.70 ppm in $^1$H-NMR measurement, the tertiary amine peak at 2.40 to 2.55 ppm in a relatively high magnetic field and the peaks of secondary amines at 2.55 to 2.60 ppm and primary amines at 2.60 to 2.70 ppm disappeared. In the measurement results of $^{13}$C-NMR also, the tertiary amine peak at 51.0 to 56.0 ppm and the peaks of secondary and primary amines at 39.0 to 51.0 ppm disappeared. It was presumed from the elemental analysis and the NMR integral ratios that about 100% of all nitrogen atoms (N) in the precursor compound were oxidized into N-oxides.

The same process as in Example 5 was performed except that 17.9 g of an aqueous solution of the compound obtained as above was used. As a result, 70.0 g of an aqueous silver colloidal solution having a nonvolatile content of about 60% was obtained (44.1 g as a nonvolatile component, yield: 92%). Thermal analysis (Tg/DTA) found that the silver content in the nonvolatile component was 96.5%.

Example 10 (Synthesis of Silver Colloidal Solution by Using Nitrogen-Containing Compound Prepared by Oxidizing Precursor Compound a-2 with Oxone (Registered Trade Mark of DuPont)

The precursor compound a-2 (1.99 g) produced in Synthetic Example 3 was dissolved in 10 mL of water and Oxone (142 mg, 0.23 mmol) was added thereto. The resulting mixture was left to stand at room temperature overnight. The mixture was diluted with 250 mL of purified water and N,N-dimethylaminoethanol (69.5 g, 0.78 mol) was added to prepare a protecting agent-reducing agent solution. Silver nitrate (44.2 g, 0.26 mol) was dissolved in 75 mL of purified water to separately prepare an aqueous silver nitrate solution.

The aqueous silver nitrate solution was added dropwise to the protecting agent-reducing agent solution at room temperature over 30 minutes and then the mixture was stirred at 50° C. for 3 hours. After cooling, acetone (1.4 L) was added, which was followed by stirring. The precipitates generated were separated by centrifugal separation and combined with 50 mL of water to be re-dispersed. The resulting dispersion was concentrated at reduced pressure until the volatile content was 30%. As a result, a silver colloidal solution was obtained (86.2 g as a water dispersion, 25.8 g as a nonvolatile component, pure silver content: 96.7%, yield: 89%).

Example 11 (Synthesis of Silver Colloidal Solution by Using Nitrogen-Containing Compound Prepared by Oxidizing Precursor Compound a-2 with Peracetic Acid)

The precursor compound a-2 (1.99 g) obtained in Synthetic Example 3 was dissolved in 10 mL of water and a 32% peracetic acid solution (55 mg, 0.23 mmol equivalent, produced by Aldrich) was added. The resulting mixture was left to stand at room temperature for one day. The rest of the process was the same as in Example 10 and a silver colloidal solution (about 30%) was obtained (84.3 g as a water dispersion, 25.2 g as a nonvolatile component, pure silver content: 97.0%, yield: 87%).

Example 12

After 42.5 g (N equivalent, 531 mmol) of ethyleneimine-b-polyethylene glycol-b-bisphenol A epoxy resin, which is a precursor obtained in Synthetic Example 3, was dissolved in 100 mL of pure water, 25.8 g (265.5 mmol, 50 mol % relative to N equivalent) of a 35% aqueous hydrogen peroxide solution was slowly added to the resulting solution under stirring in an ice bath and oxidation reaction was performed for 5 hours.

Measurement results of $^1$H-NMR of the obtained product are as follows.

Measurement results of $^1$H-NMR (DMSO-$d_6$):

δ (ppm)=7.55 to 6.75 (m), 4.40 to 3.90 (m), 3.6 (m, PEGM methylene), 3.30 to 3.20 (m, N-oxide ethylene), 3.25 (s, methoxy group at PEGM chain terminal), 2.9 (m, N-oxide ethylene), 2.70 to 2.50 (m, branched PEI ethylene), 1.62 (s).

In the branched PEI ethylene at 2.40 to 2.70 ppm in $^1$H-NMR measurement, the tertiary amine peak at 2.40 to 2.55 ppm in a relatively high magnetic field disappeared and the peaks of secondary amines at 2.55 to 2.60 ppm and primary amines at 2.60 to 2.70 ppm decreased, resulting in a decrease in the integral ratio thereof. It was presumed from the NMR integral ratios that about 50.0 to 55.0% of all nitrogen atoms (N) in the precursor compound were oxidized into N-oxides.

The same process as in Example 5 was performed except that 16.5 g of an aqueous solution of the compound obtained as above was used. As a result, 76.0 g of an aqueous silver colloidal solution having a nonvolatile content of about 60% was obtained (45.6 g as a nonvolatile component, yield: 95%). Thermal analysis (Tg/DTA) found that the silver content in the nonvolatile component was 95.8%.

Comparative Example 1

The precursor compound a-1 (3.24 g) obtained in Synthetic Example 2 was dissolved in 410 mL of water and N,N-dimethylaminoethanol (113 g, 1.27 mol) was added thereto to prepare a protecting agent-reducing agent solution. The rest of the process was the same as in Example 1. As a result, a silver colloidal solution (about 30%) was obtained (139 g as a water dispersion, 41.0 g as a nonvolatile component, pure silver content: 96.1%, yield: 86%).

Comparative Example 2

The precursor compound a-2 (1.99 g) obtained in Synthetic Example 3 was dissolved in 260 mL of water and N,N-dimethylaminoethanol (69.5 g, 0.78 mol) was added thereto to prepare a protecting agent-reducing agent solution. The rest of the process was the same as in Example 5. As a result, a silver colloidal solution (about 30%) was obtained (83.9 g as a water dispersion, 24.6 g as a nonvolatile component, pure silver content: 95.9%, yield: 84%).

TABLE 1

| | Precursor compound | Oxidizing agent (mol % added when the total number of nitrogen atoms is assumed to be 100) | Resistivity of silver thin film fired for 30 minutes (μΩ · cm) | | | |
|---|---|---|---|---|---|---|
| | | | 120° C. | 150° C. | 180° C. | 250° C. |
| Example 1 | a-1 | Ammonium persulfate (1) | 8.0 | 5.5 | 5.0 | 4.5 |
| Example 2 | | Ammonium persulfate (2) | 4.7 | 3.6 | 3.0 | 3.6 |
| Example 3 | | Ammonium persulfate (5) | 9.3 | 4.7 | 3.3 | 3.1 |
| Example 4 | | 30% aqueous hydrogen peroxide solution (2) | 7.9 | 5.8 | 4.4 | 4.1 |
| Comparative Example 1 | | None | O.L. | O.L. | 270 | 58 |
| Example 10 | a-2 | Oxone (2) | 11 | 14 | 12 | 5.7 |
| Example 11 | | Peracetic acid (2) | 41 | 19 | 6.8 | 4.1 |
| Comparative Example 2 | | None | O.L. | O.L. | O.L. | 380 |

O.L.: Over scale

TABLE 2

| Example | Silver content in nonvolatile component (%) | Yield (%) | Average particle size (nm) | Stability (room temperature, 1 week) |
|---|---|---|---|---|
| Example 1 | 96.5 | 92 | 30.9 | No settling |
| Example 2 | 97.0 | 89 | 25.1 | No settling |
| Example 3 | 96.8 | 90 | 28.7 | No settling |
| Example 4 | 97.0 | 89 | 27.3 | No settling |
| Example 10 | 96.7 | 89 | 38.1 | No settling |
| Example 11 | 97.0 | 87 | 35.5 | No settling |
| Comparative Example 1 | 96.1 | 86 | 29.3 | Slight settling occurred |
| Comparative Example 2 | 95.9 | 84 | 30.7 | Settling occurred |

TABLE 3

| | Precursor compound | Oxidizing agent (mol % added when the total number of nitrogen atoms is assumed to be 100) | Resistivity of silver thin film fired for 30 minutes (μΩ · cm) | |
|---|---|---|---|---|
| | | | 125° C. | 180° C. |
| Example 5 | a-1 | 35% aqueous hydrogen peroxide solution (11) | 7.6 | 4.3 |
| Example 6 | a-1 | 35% aqueous hydrogen peroxide solution (30) | 7.0 | 4.1 |
| Example 7 | a-1 | 35% aqueous hydrogen peroxide solution (50) | 5.6 | 3.7 |
| Example 8 | a-1 | 35% aqueous hydrogen peroxide solution (70) | 7.5 | 3.9 |
| Example 9 | a-1 | 35% aqueous hydrogen peroxide solution (100) | 3.8 | 3.6 |
| Example 12 | a-2 | 35% aqueous hydrogen peroxide solution (50) | 90 | 15 |

The amount of acetone needed in and the time required for the settling treatment in synthesizing the metal colloidal solutions in Examples 5 to 9 and 12 and Comparative Examples 1 and 2 are shown in the table below.

TABLE 4

| | Amount of acetone used (relative to volume of reaction solution) | Settling time | Average particle size (nm) | Stability (room temperature, 1 week) |
|---|---|---|---|---|
| Example 5 | Three-fold | 0.5 hour | 30.5 | No settling |
| Example 6 | Three-fold | 0.5 hour | 32.1 | No settling |
| Example 7 | Three-fold | 0.5 hour | 29.8 | No settling |
| Example 8 | Three-fold | 0.5 hour | 30.1 | No settling |
| Example 9 | Three-fold | 0.5 hour | 28.5 | No settling |
| Example 12 | Three-fold | 0.5 hour | 33.6 | No settling |
| Comparative Example 1 | Five-fold | 4 hours | 29.3 | Slight settling occurred |
| Comparative Example 2 | Five-fold | 8 hours | 30.7 | Settling occurred |

INDUSTRIAL APPLICABILITY

Metal nanoparticle composite bodies of the present invention have a narrower particle size distribution than metal nanoparticles obtained in the related art and composite bodies constituted by the metal nanoparticles of the related art and a protecting agent, and are thus more uniform. Storage stability of a colloidal solution prepared from the metal nanoparticle composite bodies of the present invention is excellent. Moreover, the purification process can be simplified. A colloidal solution obtained has good low-temperature firing fusing properties and is thus suitable for a conductive ink material for PE compatible with printing methods, such as an ink jet method, a micro contact method, and a reverse letterpress printing method. Accordingly, the metal nanoparticle composite bodies are suitable for use in producing liquid crystal display driver circuits, touch screen circuits, and IC card antennas as well as forming circuits for printed wiring boards.

The invention claimed is:
1. A method for producing a metal nanoparticle composite body, comprising the steps of
    reducing metal ions in a medium in the presence of a nitrogen-containing compound (A) containing an oxidized nitrogen atom,
    wherein the nitrogen-containing compound (A) which is oxidized have polyalkyleneimine structure; and the metal nanoparticle composite body comprises the nitrogen-containing compound (A) and a metal nanoparticle (B), wherein the oxidized nitrogen atom in the nitrogen-containing compound (A) takes a form of at least one selected from the group consisting of N-oxide, N-hydroxide, nitrone, nitroso, and a nitro compound.

2. The method for producing a metal nanoparticle composite body according to claim 1, wherein the metal nanoparticle (B) is a silver nanoparticle.

3. The method for producing a metal nanoparticle composite body according to claim 1, wherein the oxidized nitrogen atom in the nitrogen-containing compound (A) takes a form of at least one selected from the group consisting of N-oxide, nitrone, nitroso, and a nitro compound.

4. The method for producing a metal nanoparticle composite body according to claim 1, wherein the metal nanoparticles (B) have an average particle size in the range of 5 to 50 nm.

5. The method for producing a metal nanoparticle composite body according to claim 1, wherein a content of the oxidized nitrogen atom is 0.5% or more of the total number of nitrogen atoms contained in the nitrogen-containing compound (A).

6. The method for producing a metal nanoparticle composite body according to claim 1, wherein the molecular weight of the nitrogen-containing compound (A) has a weight-average molecular in the range of 500 to 200,000.

7. The method for producing a metal nanoparticle composite body according to claim 1, wherein the molecular weight of the nitrogen-containing compound (A) has a weight-average molecular in the range of 1,000 to 100,000.

8. A method for producing a metal colloidal solution, comprising the steps of reducing metal ions in a medium in the presence of a nitrogen-containing compound (A) containing an oxidized nitrogen atom to form metal nanoparticle composite bodies;

adding a poor solvent to form a precipitation of the metal nanoparticle composite bodies; and dispersing the precipitation of the metal nanoparticle composite bodies in water or an organic solvent, wherein the nitrogen-containing compound (A) which is oxidized have polyalkyleneimine structure; and the metal nanoparticle composite body comprises the nitrogen-containing compound (A) and a metal nanoparticle (B), wherein the oxidized nitrogen atom in the nitrogen-containing compound (A) takes a form of at least one selected from the group consisting of N-oxide, N-hydroxide, nitrone, nitroso, and a nitro compound.

9. The method for producing a metal colloidal solution according to claim 8, wherein the metal nanoparticle (B) is a silver nanoparticle.

10. The method for producing a metal colloidal solution according to claim 8, wherein the oxidized nitrogen atom in the nitrogen-containing compound (A) takes a form of at least one selected from the group consisting of N-oxide, nitrone, nitroso, and a nitro compound.

11. The method for producing a metal colloidal solution according to claim 9, wherein the metal nanoparticles (B) have an average particle size in the range of 5 to 50 nm.

12. The method for producing a metal colloidal solution according to claim 9, wherein a content of the oxidized nitrogen atom is 0.5% or more of the total number of nitrogen atoms contained in the nitrogen-containing compound (A).

13. The method for producing a metal colloidal solution according to claim 7, wherein the molecular weight of the nitrogen-containing compound (A) has a weight-average molecular in the range of 500 to 200,000.

14. The method for producing a metal colloidal solution according to claim 7, wherein the molecular weight of the nitrogen-containing compound (A) has a weight-average molecular in the range of 1,000 to 100,000.

* * * * *